Sept. 17, 1929.  O. TUERCK  1,728,519

OFF BEARING CART

Filed June 30, 1928  2 Sheets-Sheet 1

Inventor:
Oscar Tuerck,
Attorney;
Horace Barnes,

Sept. 17, 1929.   O. TUERCK   1,728,519
OFF BEARING CART
Filed June 30, 1928   2 Sheets-Sheet 2

Inventor:
Oscar Tuerck,
Attorney:
Horace Barnes

Patented Sept. 17, 1929

1,728,519

UNITED STATES PATENT OFFICE

OSCAR TUERCK, OF PORTLAND, OREGON, ASSIGNOR TO TUERCK-MACKENZIE COMPANY, A CORPORATION OF OREGON

OFF-BEARING CART

Application filed June 30, 1928. Serial No. 289,563.

This invention relates to improvements in off-bearing carts pertinent to concrete pipe-making machines.

The object of my invention is the provision of a wheeled vehicle of simple construction for lifting, conveyance, and deposit of concrete pipe molds and contained concrete pipe of large diameters from the machine where the concrete pipe is formed to the curing room.

A further object of the invention is to provide in a cart of the class described simple and practical manually operated means for lifting the mold and pipe, which is often of relatively great weights.

A still further object of the invention is the provision of means for depositing the mold and contained pipe upon the floor of the curing room and the transfer of a portion of the weight of the cart upon the mold with provision for the support of additional weights added thereto to cause the longitudinal displacement of the mold upon the pipe by the combined gravities of the cart and weights whereby the suction force between the mold sections and the pipe may be broken to more readily separate them.

Other objects and advantages, and objects relating to details of construction and arrangement of parts of the invention will be readily apparent in the course of the detailed description to follow.

The accompanying drawings illustrate by way of example one form of my invention, in which.

Figure 5:
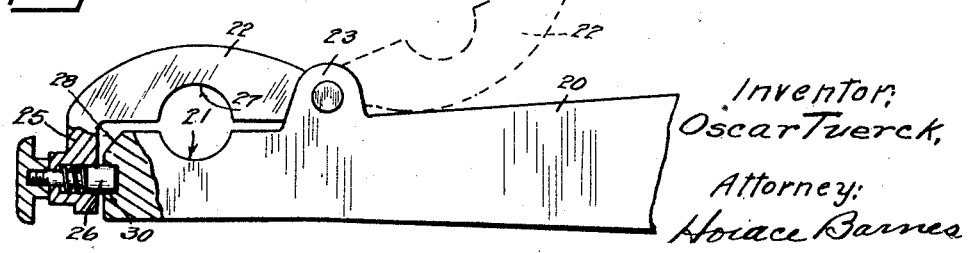
Fig. 5 is a view in side elevation of an element of the invention.

Referring to said views the reference numerals 1 indicate horizontally disposed beams arranged in parallel in adjusted spaced relation through transverse bars 2 and 3. Each of said bars is comprised of members A and B rigidly connected to the respective beams at 5 and each of which is formed with a pair of slots 6 registering with bolts 7 secured at apertures in the extremities of the respective said members extending through the slots of the opposite members whereby the bars may be rigidly maintained and the beams secured in parallel condition. Said beams are each formed of parallel plates 8 rigidly secured together by spacing members 10. Near the forward extremity of each said beam wheels 11 are journaled between the plates 8 and at the rear extremity of each beam smaller or caster wheels 12 are mounted in swivel bearings 13 thus providing four-wheel support for the cart. Adjacent each of the wheels 11 is a journal frame comprised of spaced members 15, each rigidly connected to the respective plates 8 and provided at their tops with journal bearings 16 in which a pivotal pin 17 is mounted. A lever 18 is fulcrumed intermediate its ends upon the pin 17 upon said frame between the members 15 extending forwardly in an arm 20 formed near its extremity with a substantially semi-circular transverse notch 21 on its upper side. A latch-dog 22 is pivoted in ears 23 upon the upper side of the arm 20 and is formed at its outer end with a projection 25 adapted to be swung over the forward extremity of the arm wherein a spring-pressed keeper 26 is provided to releasably secure the latch-dog in closed position as seen in full lines in Fig. 5. The latch-dog is formed on its underside with a semi-circular notch 27 opposed to and registering with the notch 21. Said latch-dog is arranged to swing rearwardly as indicated by broken lines in Fig. 5 to open the circular notches 21—27 and the forward end of the arm 20 is beveled on its upper corner, as at 28, so that the keeper will engage thereagainst and enter automatically a recess 30 in the end of the arm 20 when the latch-dog is swung forwardly.

The lever 18 also comprises arm 31 extending in line with the arm 20 and terminating in a rack 32 whose teeth are arranged in an arc about the fulcrum pin 17. A pedestal 33 is formed at the rear extremity of each of said beams in which a gear wheel 35 is mounted in mesh with the respective racks 32. An arbor 36 is mounted in said pedestals and extending transversely of the cart having pinions 37 keyed thereto at each end in mesh with the respective gears 35. A hand wheel 38 is keyed to said arbor upon the outside of one of said pedestals. Said arbor is extensible to correspond with the varying adjusted widths of the cart being formed of aligned members C and D which are joined by a tubular sleeve 41 telescopically mounted on the ends of said arbor members and arranged to be secured by set-screws 40.

Keyed upon said arbor on the inner side of the pedestal near which the hand wheel 38 is mounted is a ratchet wheel 42 having teeth 43 on its perimeter of relatively rectangular configuration. A pawl 45 of symmetrical configuration is pivoted to the pedestal frame and is arranged to engage with said ratchet teeth upon either of its opposite sides to secure said arbor in locked engagement to prevent its rotation in either rotary direction.

The pipe mold with which my improved off-bearing cart is adapted to be employed comprises two half-sections 50 and 51 formed of sheet steel and reinforced at their upper and lower extremities by a rim 52 and a base 53, respectively. The inner marginal edge of the base 53 is formed with a beveled lip 55 upon which an annular palette 56 is supported. The concrete pipe 57 is formed within said mold and upon the palette 56 in a suitable machine wherein the base 53 is supported upon a turn-table and the legs 58 of the palette extend into spaces in the turn-table provided therefore in a well-known manner. The mold sections 50 and 51 are connected together by means of latching devices 60 intermediate the meeting edges of the sections. They are each provided with a trunnion-pin 61 rigidly connected to the mold body about its center of gravity whereby said trunnion-pins are in a horizontal radial line through the mold.

Figure 1:
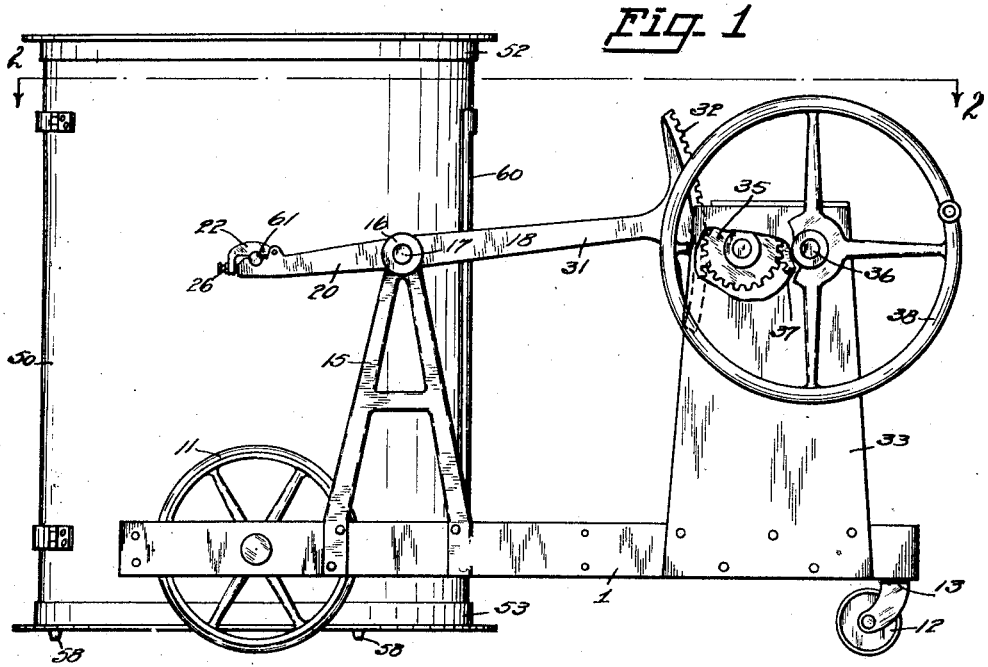
Figure 1 is a view in side elevation of an embodiment of my invention illustrative as supporting a pipe mold in carrying condition.
Figure 2:
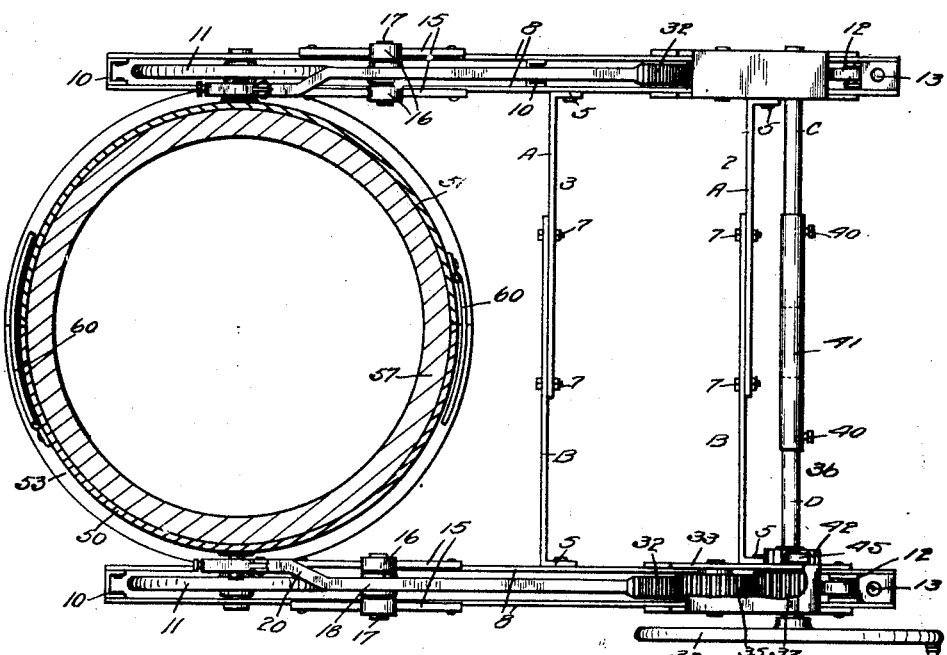
Fig. 2 is a view partly in plan and partly in horizontal section on line 2—2 of Fig. 1.
Figure 4:
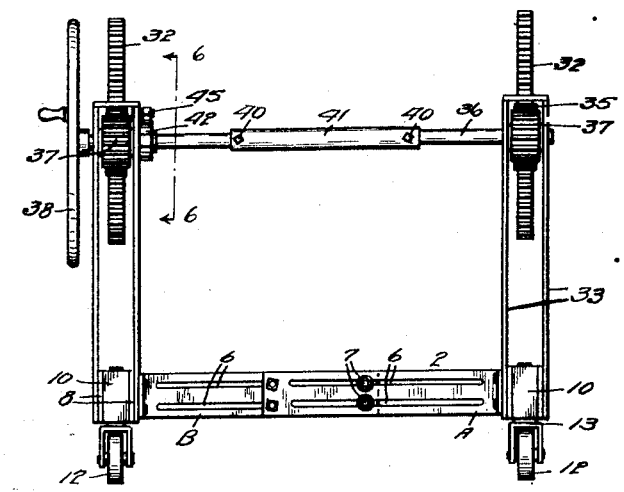
Fig. 4 is a view in rear elevation of the invention.
Figure 6:
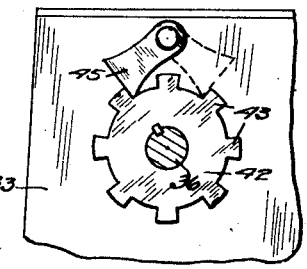
Fig. 6 is a detail view of the securing means for the pipe-lifting devices, taken on line 6—6 of Fig. 4.
Figure 3:
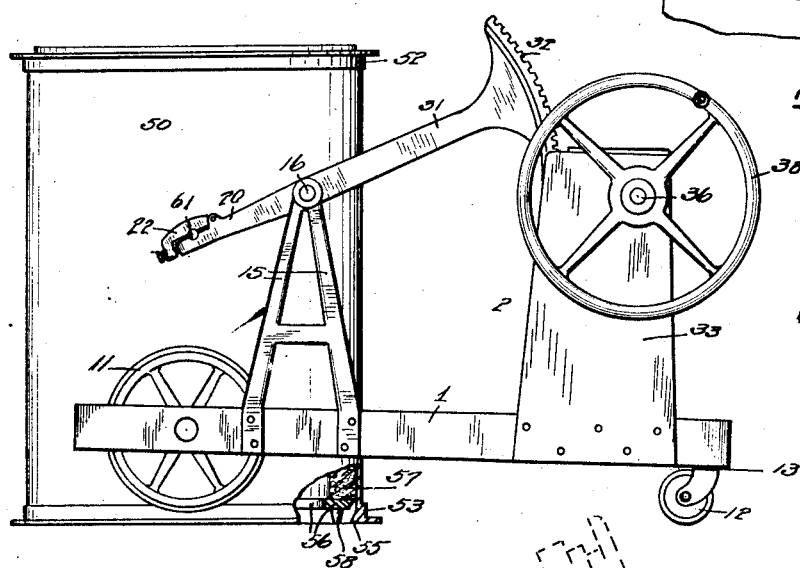
Fig. 3 is a view similar to Fig. 1 illustrating my improved cart subsequent to having deposited a pipe mold.

The operation of my improved off-bearing cart may be described as follows. After the pipe is fully formed in the mold and the core therein removed, the off-bearing attendants, usually two in number, when handling pipe of relatively large size, push the cart forwardly to straddle the pipe mold with the lever arm 20 depressed sufficiently for its extremities to lie slightly under the trunnions 61. The hand wheel is then manipulated to raise the forwardly projecting arms 20 to lift the mold and pipe off of its supporting turn-table to a sufficient elevation to clear all ground obstructions. The latch-dogs 22 are then swung over into latched engagement through the keeper 26 securing the trunnions 61 in the notches 21 and 27. In such elevated position of the mold the lever 18 is secured by engaging the pawl 45 upon its proper side with the ratchet teeth 43. The cart and load is then trundled to its place of deposit, as within a curing room, where the proper temperature and atmospheric conditions are maintained. The pawl 45 is then released and the hand wheel 38 manipulated to elevate the arm 31 of the lever 18 and depress the arm 20 thereof to deposit the mold upon the floor where the legs 58 of the palette will support it temporarily. The operator, however, continues to rotate the hand wheel 38 whereupon the cart at its forward end will be lifted with the weight of such end borne upon the pipe mold through the latch-dog 22 and supported at its rear end in tilted condition upon the caster wheels 12. Upon the attendants' releasing the latching devices 60 securing the mold sections together, the considerable weight of the cart borne upon the pipe mold will tend to cause the pipe mold to slip downwardly along the plastic surface of the newly formed concrete pipe. If the resistance due to suction is sufficiently great to withstand such pressure the attendants, one upon each side, mount upon the beams 1 and with such added burden the pipe mold invariably slips downwardly along the pipe and rests upon the floor, as indicated in Fig. 3.

The latch-dogs 22 are then disengaged from the trunnions 61 and the cart moved away. The pipe sections may then be readily removed from the pipe mold leaving the pipe standing upon its palette 56 on the curing room floor. The sections 50 and 51 are then assembled together with a fresh palette secured therein. The cart is then rolled into position to engage the same and it is elevated in the manner described and the mold is then wheeled back to be placed in operative position upon the machine.

Having described my invention, what I claim, is:—

1. An offbearing cart including means to support a load from the forward end of said cart, and means to deposit said load upon the ground and support the forward end of the cart upon said load.

2. An offbearing cart, means to engage a load and elevate the same from the ground, said means being adapted to deposit the load upon the ground and elevate the end of the cart secured to the load to rest with its weight upon the load.

3. An offbearing cart having a pair of levers pivoted adjacent the front end of said cart adapted to be depressed and elevated to secure and support a load thereon, and means to actuate said levers whereby the levers may be depressed in depositing the load to elevate the front end of the cart in supported condition upon its load.

4. An offbearing cart consisting in corresponding sidebeams provided with wheels at their extremities, adjustable devices for connecting said beams together in parallel relation, a lever pivoted intermediate its ends in each said frame, an actuated rack on the rear arm of each said lever, gear-devices mounted on each said beam in mesh with the respective lever-rack, a detent arranged to secure said gear-devices and lever in set positions, and latching devices secured to the forward arm of each said lever whereby pivoted support for a load may be provided or the front end of the cart be pivotally supported thereon.

5. An off-bearing cart, consisting in a wheel-supported frame including a pair of side-beams and adjustable transverse members to secure said beams in spaced distances apart, a pair of levers fulcrumed in said frame having latching means at one end to secure a load therebetween, and means to actuate said levers.

6. An off-bearing cart as specified in claim 5 wherein said latching means consists in a latch-dog pivoted to the end of each said lever provided with a spring-pressed keeper adapted to engage and latch at the extremity of the lever, there being oppositely disposed notches to provide bearings in the lever and latch-dog.

7. An off-bearing cart, consisting in a wheel-supported frame including a pair of side-beams and adjustable transverse members to secure said beams at spaced distances apart, a pair of levers fulcrumed in said frame having latching-means at one end to secure a load therebetween, a transverse arbor adjustable as to length to the width of the frame, and means upon said arbor to actuate the levers.

OSCAR TUERCK.